United States Patent Office 3,483,683
Patented Dec. 16, 1969

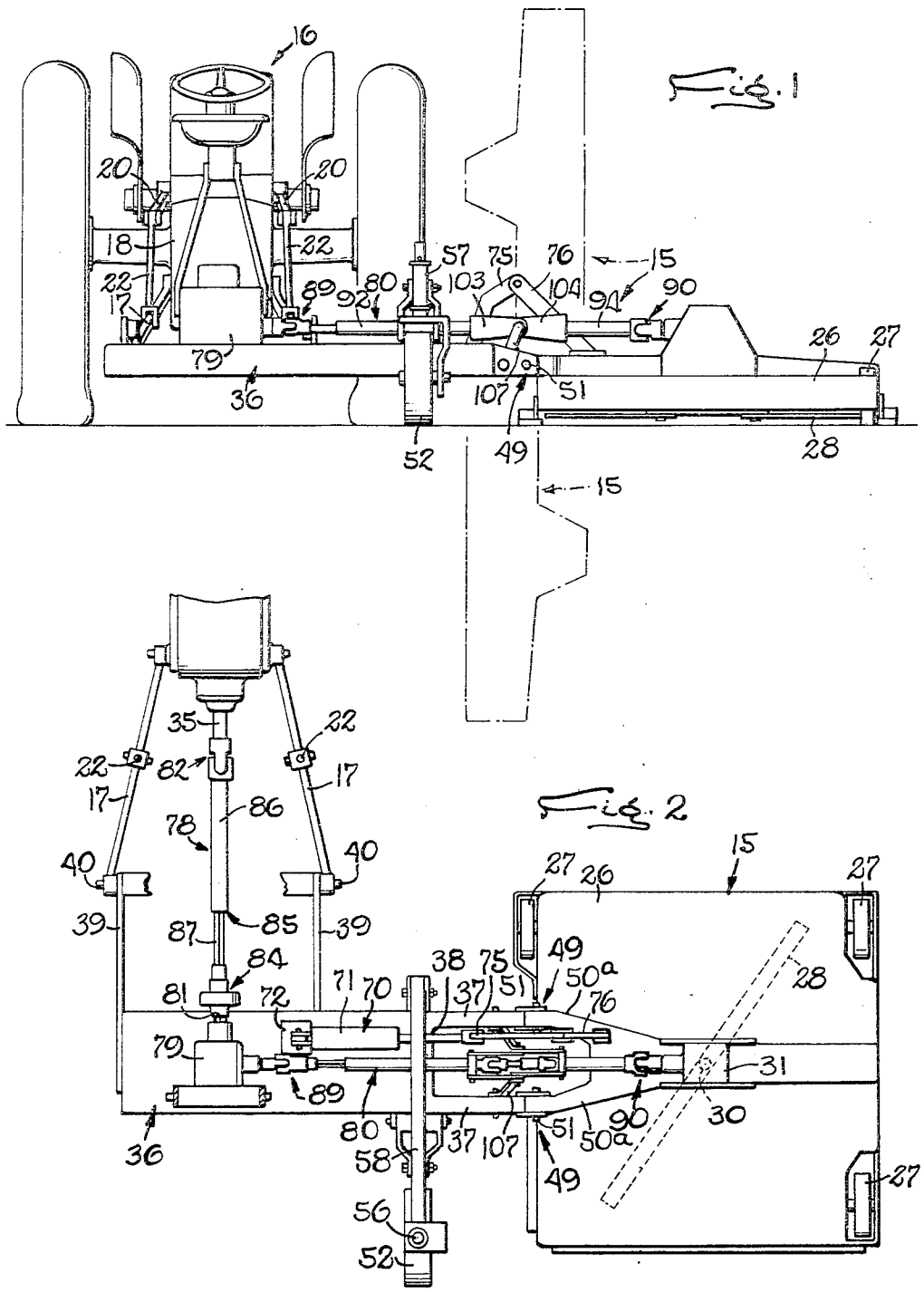

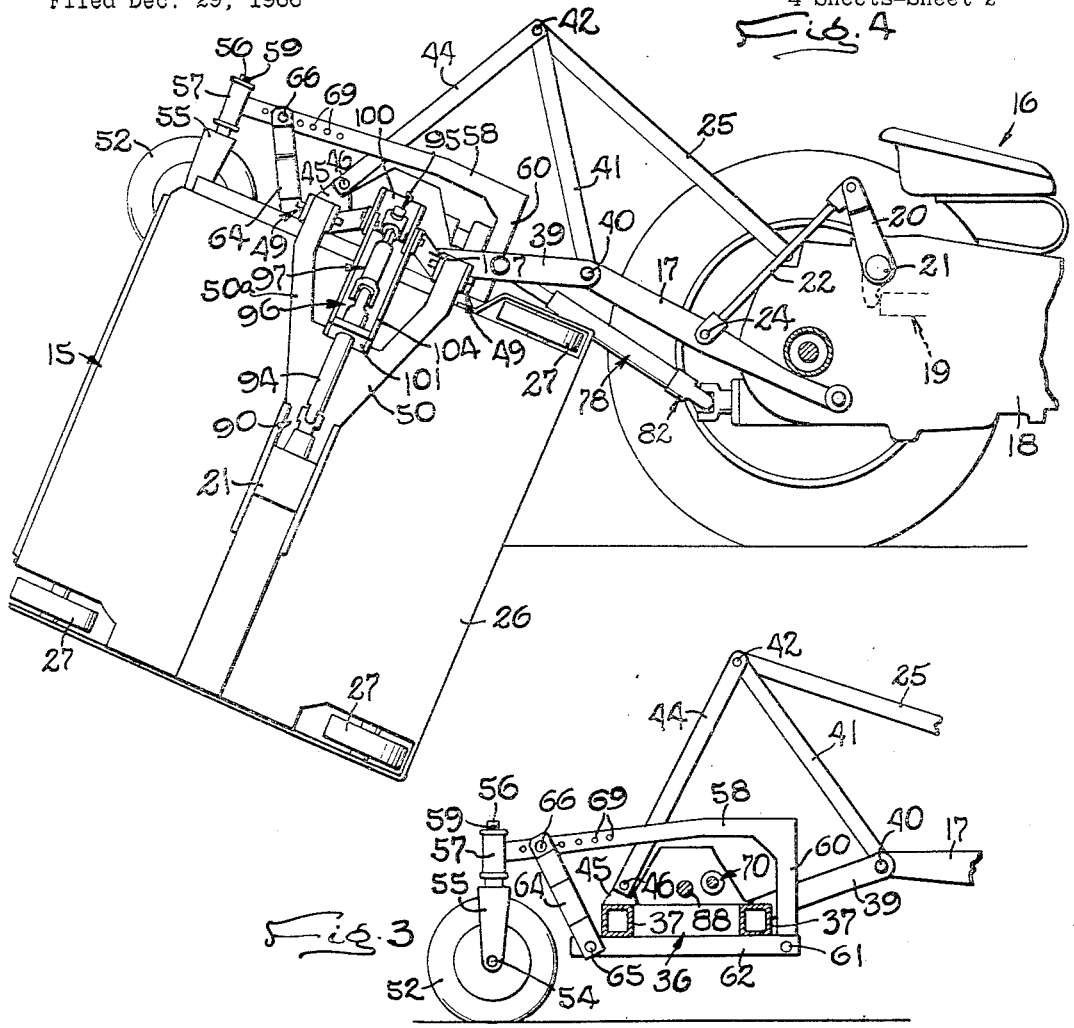
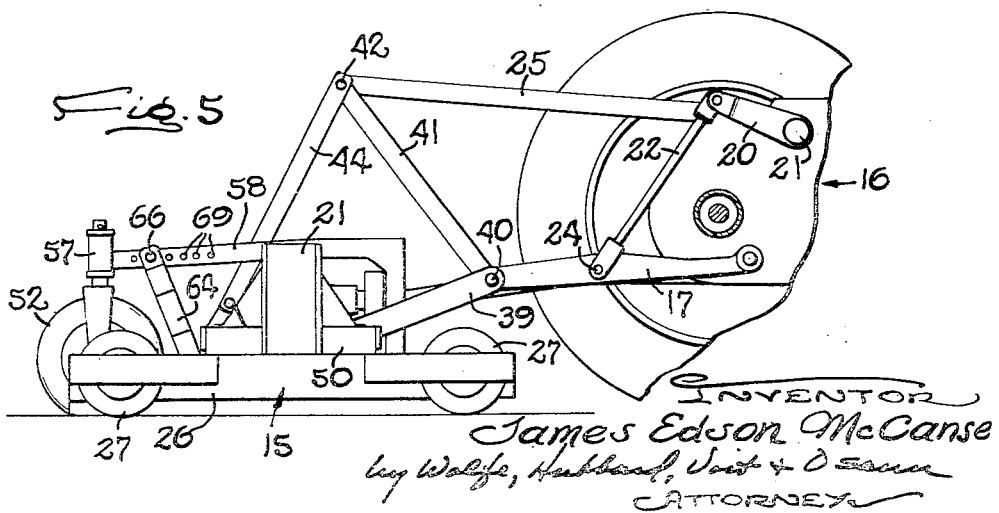

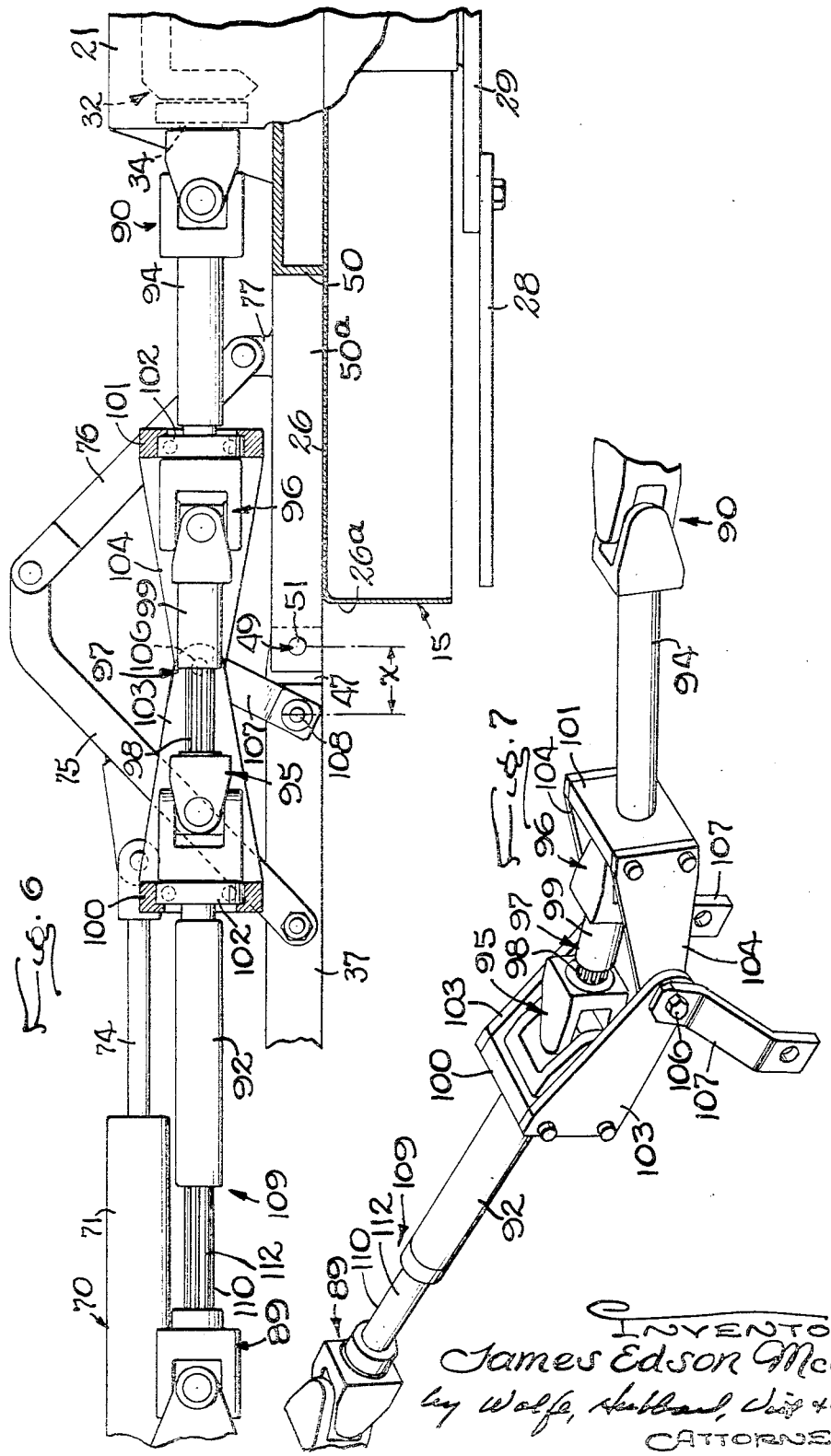

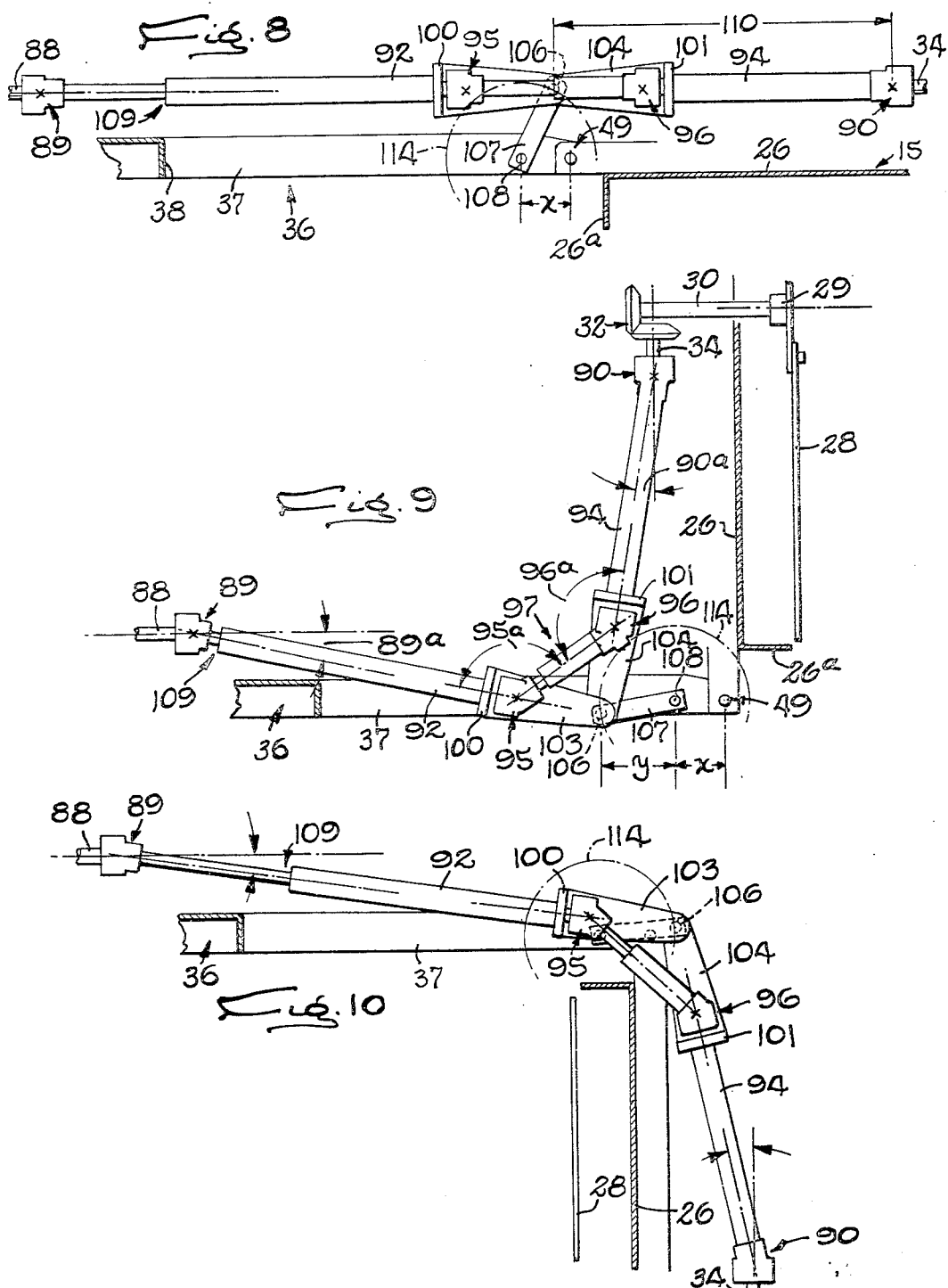

3,483,683
CONSTANT VELOCITY DRIVE
James E. McCanse, Oregon, Ill., assignor, by mesne assignments, to Hesston of Delaware, Inc., Wilmington, Del., a corporation of Delaware
Filed Dec. 29, 1966, Ser. No. 605,784
Int. Cl. A01d 55/26; F16d 3/30
U.S. Cl. 56—25.4      7 Claims

ABSTRACT OF THE DISCLOSURE

A power mower of the type pivotally connected to a support frame attached to a tractor and of the type whose blade is powered from the power take-off of the tractor. To allow the mower to pivot about its connection to the frame and still for the blade to be powered at an even rate, a drive shaft with four universal joints and two torque transmitting slide connections is used to transmit power between the power take-off and the mower. The universal joints are paired and the pairs are connected in the shaft at right angles measured around the axis of the shaft and the pairs are forced to bend at substantially equal angles as the mower is pivoted about its connection to the frame so that each joint of each pair will cancel out the angular acceleration of the other of the pair to drive the blade at a constant rate.

The invention relates to a rotary mowing implement of the type which is pulled along the ground by a tractor, and more particularly, the invention relates to a support arrangement for mounting the implement on the tractor and to a drive arrangement for driving the blade by the power take-off shaft of the tractor.

The general object of this invention is to mount a mower on a tractor in an improved manner such that the position of the mower can be regulated with ease and precision and the blade thereof is driven by the tractor power take-off shaft in any position of the mower.

Another object of this invention is to mount a rotary mower on a tractor in a manner making it easy to cut grass on steep banks and around obstacles while not impairing the use of the mower for cutting level expanses of grass.

Still another object of this invention is to provide an improved drive arrangement for connecting driving and driven members mounted to pivot relative to one another, such as a rotary mower pivotally mounted on a tractor, which drive arrangement is of the constant speed type for driving the driven member at a velocity equal to that of the driving member throughout each revolution and with the driven member being pivoted to any of several positions relative to the driving member.

Other objects and advantages of the invention will become apparent from the following detailed description taken in connection with the accompanying drawings, in which FIG. 1 shows a tractor and a rotary mower, with the mower being mounted on the tractor by use of the present invention and shown in dotted outline pivoted to several of the positions to which it can be moved.

FIG. 2 is a top plan view of the mower and a portion of the tractor of FIG. 1.

FIG. 3 is a cross-sectional view along the line 3—3 of FIG. 2 showing the implementing wheel mounting.

FIGS. 4 and 5 are side elevation views of the mower and a portion of the tractor showing the mower moved to different positions.

FIG. 6 is an enlarged elevation view of a portion of the drive arrangement connecting the power take-off shaft of the tractor and the rotary mower.

FIG. 7 is a perspective view of the drive arrangement shown in FIG. 6.

FIGS. 8, 9 and 10 are side elevation views showing the drive arrangement of FIG. 4 moved to several different positions.

In the drawings, the invention is shown embodied in an implement or rotary mower 15 for mounting behind a tractor 16 to be pulled along the ground for cutting grass. It will be seen that while the invention is embodied in a rotary mower, it can be used with equal success with other types of implements for supporting tools instead of blades and which normally are mounted on a tractor or other such vehicle. The tractor is equipped with a hitch arrangement of a standard design having a pair of lower links or draw bars 17 pivotally mounted to the tractor frame 18 for attachment at the outer ends of an implement. The tractor is equipped also with a hydraulic lift 19 having two lift arms 20 fixed at one end to a shaft 21 with the free end of each arm being connected to one of the draw bars 17 by a lifting link 22 for raising and lowering an attached implement. The lifting links are pivotally fixed at the mid-point of the draw bars by pins 24 such that turning of the actuator shaft 21 to shift the cranks 20 thereabout will raise the links 22 and pivot the draw bars about the end attached to the tractor frame. An upper stabilizing arm 25, pivotally connected to the tractor frame at a point above the draw bars for connecting to the implement, holds the latter in a substantially horizontal position as it is raised and lowered with the hydraulic lift and is regulated by controls (not shown).

The rotary mower 15 includes a housing 26 which, when in the cutting position, rides parallel to the ground surface on three wheels 27 journaled at the corners thereof. For cutting the grass, a plurality of blades 28 are enclosed within the housing and are attached at one end to a central hub 29 fixed to a rotatable shaft 30 extending through the housing and driven by means of a gearbox 31 mounted above the housing and including a bevel gear arrangement 32 (FIGS. 2 and 6). By rotation of an input shaft 34 of the gearbox, the shaft 30 is rotated by the gear arrangement for turning the hub and blades beneath the housing. A power take-off shaft 35 of the tractor is used to drive the input shaft 34 of the mower.

Frequently, it is desirable to use such a rotary mower for cutting the sloping sides of hills or ditches. In many areas, and particularly along highways, the sides of drainage ditches and fill areas lie at such steep angles that there is danger of the tractor upsetting if driven therealong. A further problem exists in attempting to cut the crown of a slope in that the mower blades frequently contact the ground resulting in the grass being "scalped." There are also many obstacles to cut around, such as trees, shrubs and guard rails and ordinarily, cutting in each of these areas just described has required a different mower for each job, or has resulted in the cutting being accomplished in a less proficient manner if the same mower has been used for all the jobs.

In accordance with the present invention, a mounting arrangement is provided for attaching the rotary mower 15 to the conventional hitching arrangement of a tractor, which mounting arrangement positions the mower to one side of the tractor and allows tilting of the mower, as well as the raising and lowering thereof by use of the conventional lift, thereby making it easier to cut along slopes and around objects while not impairing the use of the mower for cutting level expanses of grass. Accordingly, a support frame 36 is adapted to be mounted on the conventional drawbar arms 17 of a tractor such as the one heretofore described, for supporting the rotary mower 15 in a position offset to one side of the tractor and such that the mower may be tilted relative to the frame while the frame itself may be raised and lowered by use of the hydraulic lift of the tractor.

To these ends, the frame 36 comprises a pair of cross members 37 secured together by a cross brace 38 with a pair of arms 39 fixed thereto and extending forward and slightly upward beyond the forward cross member 38. The frame is mounted on the tractor in a generally horizontal position by having pins 40 (FIGS. 4 and 5) inserted through alined openings in the overlapping ends of the arms 39 and the drawbar 17. The stabilizing arm 25 of the tractor is attached to the frame by rigid links 41 pinned at one end to the stabilizing arm by a bolt 42, with each link being made fast to one of the arms 39 by the pin 40 passing therethrough. Additionally, a third stabilizing arm 44 also is pinned to the stabilizing arm 25 by the bolt 42 with the other end being pivotally fixed to a bracket 45 on the rear cross member 37 of the frame by a bolt 46. Thus, the frame may be raised (FIG. 4) and lowered (FIG. 3) by use of the hydraulic lift moving the drawbars 17, with the stabilizing arm 25 acting through the links 41 and 44.

The mower 15 is pivotally mounted on one side edge of the frame so as to project to one side of the tractor and past the adjacent wheel. For this purpose, the cross members 37 of the frame extend past the right arm 39 to a point beyond the right wheel of the tractor (FIGS. 1 and 2). Fixed to the vertical sides of each extending end of these cross members are hinges 49 having alined openings in the ends of plates 47 for mounting the mower on the frame. A yoke 50 is fixed to the top surface of the mower housing 26 and includes extending arms 50a which aline and fit between the plates 47. The arms 50a and plates 47 include alined openings through which are inserted bolts 51 thus forming the hinge 49 for pivotally attaching the mower 15 to the frame 36.

For supporting a portion of the weight of the overhanging mower a wheel 52 (FIGS. 1–3) is mounted on the extending ends of the cross members 37 at a point between the arms 39 and the mower 15. The wheel is journaled on an axle 54 fixed to a bracket 55 extending downwardly from a vertically extending shaft 56 (FIGS. 2 and 3). This shaft is passed through a sleeve 57 fixed to the extending end of a cross arm 58 secured to the cross members 37 of the frame. The shaft 56 is held within the bore by a pin 59 passing through the end thereof extending above the sleeve.

The cross arm 58 is mounted to allow the vertical adjustment of the wheel supporting end thereof so that as the frame 36 is raised or lowered the wheel is positioned. For this purpose, the forward end of the cross arm is fixed to an upstanding member 60 (FIG. 3) pivotally fixed to the frame by a bolt 61 passing through a bracket 62 fixed to the cross member 37. The end of the cross arm 58 adjacent the wheel is releasably secured to a link 64 pivoted by a bolt 65 to the bracket 62 and attached at the outer edge by a pin 66 which may be inserted into a series of holes 69 on the arm. Thus by removal of the bolt 66 and thereafter by pivoting the cross arm 58 about the bolt 61, the vertical position of the wheel relative to the frame can be changed. The cross arm 58 thereafter can be locked in the new position by alining the link 64 with another opening 69 in the cross arm and reinserting the bolt 66.

An actuator 70 is provided for pivoting the rotary mower 15 relative to the frame 36 (FIG. 2). This actuator includes a cylinder 71 having one end fixed to a bracket 72 on the frame and a longitudinally movable rod 74 extending from the other end and fixed to the midpoint of a lever 75. The lever 75 is pivotally attached at one end to the frame with the other end being coupled to an arm 76 pivotally coupled to a bracket 77 fixed on the mower housing at a point spaced from the hinge 49 and in alinement with the direction of movement of the actuator rod 74. Thus, by energization of this actuator, the rod 74 can be moved longitudinally in a direction towards and away from the hinge 49 supporting the rotary mower for pivoting the lever 75 to raise and lower the mower above and below the plane of the frame. As shown in FIG. 1, the mower in being supported and actuated in this manner can be moved from a vertical position extending below the frame to a vertical position above the frame. Additionally, as shown in FIGS. 4 and 5, by actuation of the hydraulic lift 19, the height of the frame and mower above the ground can be varied. Thus the mower can be pivoted to a large number of positions and raised and lowered independently, making it especially easy to cut the sides of ditches by pivoting the mower down into the ditch and thereafter raising and lowering the frame to position the mower along the ground for cutting. Of course, the mower can be also set in the horizontal position for cutting along level ground (FIG. 1) and, since it projects well past the outer edge of the adjacent tractor tire, trimming along walls and around objects is made easier. With the changing of the vertical height of the frame, the position of the wheel 52 preferably is changed for supporting part of the weight thereby to stabilize the mower.

The mower blades 28 are driven by the power take-off shaft 35 of the tractor in all attitudes of the mower and always at a constant velocity relative to the velocity of the power take-off shaft. Accordingly, a first telescoping drive shaft 78 (FIG. 2) is connected between the tractor power take-off shaft 35 and a gearbox 79 mounted on the frame, and a second drive shaft 80 connects this frame gearbox with the mower gearbox 31 in a manner to maintain a constant velocity drive connection between the power take-off shaft 88 and the mower blades 28 as the mower is pivoted from a horizontal position (FIGS. 1 and 8) unto raised or lowered positions (FIGS. 9 and 10).

The drive shaft 78 transmits torque between the power take-off shaft 35 on the tractor and an input shaft 81 of the frame gearbox 79, and has a pair of universal joints 82 and 84 connected out of phase, that is, the joints are positioned at a 90 degree angle to each other relative to the longitudinal axis of the shaft. Connected between these universal joints is a sliding torque-transmitting joint 86 comprising a sleeve 85 for receiving a square shaft 87. Since the frame gearbox is moved vertically only and is not pivoted relative to the input shaft, the universal joints 82 and 84 always are deflected at substantially equal angles thereby resulting in the drive shaft 81 being of the constant velocity type. The frame gearbox 79 includes gears (not shown) forming a driving connection between the input shaft 81 and the output shaft 88 positioned at right angles to each other.

In accordance with another feature of the invention, the second shaft 80 forms a torque transmitting connection between the frame gearbox output 88 and the mower gearbox input 34 to maintain a constant velocity driving connection as the mower is pivoted about the hinge 49. The drive shaft 80 includes a pair of universal joints 89 and 90 located at opposite ends of the shaft, and connected respectively to the output shaft 88 and the input shaft 34 of the mower gearbox. However, as shown (FIG. 6) the hinge 49 is located adjacent one edge 26a of the housing 26 and at a greater distance from the joint 89 than it is from the joint 90, this construction precludes a straight line drive from the output shaft 88 directly to the input shaft 34 and also results in unequal angles of the universal joints when the mower is tilted. Accordingly, first and second rigid sections 92 and 94 are fixed at one end to universal joints 89 and 90, respectively, and are connected at the other end to a pair of second universal joints 95 and 96 which are, in turn, connected together by a torque-transmitting sliding joint 97. This sliding joint 97 comprises a splined center shaft 98 which fits into the center bore of a sleeve 99.

Since the mower 26 supporting the mower gearbox 31 pivots relative to the frame 36, the four universal joints connected in the shaft 80, if uninhibited in their movement, can bend at uneven angles while maintaining a driving connection between the frame gearbox and mower gearbox shafts 88 and 34.

In accordance with the invention, it has been found that by positioning the universal joints at each pair in the drive shaft 80 out of phase and by restricting movement of the shaft, as it bends with the pivoting of the mower housing, in a predetermined manner, the universal joints can be caused to bend at equal angles with each offsetting the angular acceleration and deceleration the other of the pair to provide a constant velocity output shaft of relatively simple design. Accordingly, U-shaped brackets 100 and 101 having arms 103 and 104 of equal length are journaled on bearings 102 on the sections 92 and 94 respectively. The arms extend toward each other and on opposite sides of the sleeve 99 and are joined together by bolts 106 positioned on a common axis. The bolts 106 also connect the arms 103 and 104 to links 107 pivoted at 108 on the frame 36 offset to one side of the hinge 49 (FIG. 8) by an amount indicated at X. The members 92 and 94 extend thru the bearings 102 and the universal joints 95 and 96 are positioned thereon so that they are also equally spaced from the pivot 106.

The links 107 pivot about the cross members on the pivot 108 and force the portion 97 of the drive shaft 80 to bend in a predetermined configuration as the mower is pivoted about the frame. To accommodate such movement in the drive shaft 80, a second transmitting sliding connection 109 is included in the rigid section 92, with the former including a center shaft 110 splined as shown at 112 fitting into a longitudinally extending center bore of a sleeve 111.

As the mower 15 is pivoted about the hinge 49 relative to the frame 36 (FIGS. 1, 5 and 7) the bolts 108 form a central pivot point as the rigid sections 92 and 94 pivot thereabout to force the bolt 106 and the ends of the connected arms 103 and 104 to move through an arcuate path shown by the dot-dash line 114 (FIGS. 6, 8, and 10). In restricting the movement of the drive shaft by means of these links 107 connected with the drive shaft 80 near its mid-point to an arcuate path relative to the end of the shaft connecting with the universal joint 89, the universal joints 89 and 90, and 95 and 96 are held at substantially equal angles. Thus, each joint in being connected at a right angle to the other joint of the pair offsets the acceleration and deceleration of the other of the pair to provide constant velocity drive shaft. To explain the operation of the drive arrangement just described, with the mower 15 extending straight outward from the frame 36 (FIG. 8), the universal joints are all in a straight configuration and thereby are at equal angles. In FIG. 9, the mower is shown in the upwardly extending position relative to the frame. The angles 89a and 90a of the universal joints 89 and 90 are also substantially equal. In this case the angles depend on the combined lenth y of the link 107 and the distance x. These dimensions are variables which change with different sizes of mower but can be determined to provide the accuracy desired.

The angles 95a and 96a of the universal joints 95 and 96, are equal because of the equal spacing at the joints. In FIG. 10, the mower 15 is shown pivoted in the downwardly extending position and again the angle 89b and 90b of the universal joints 89 and 90 and the angles 94b and 95b of the universal joints 94 and 95 are substantially equal and determined by the lengths y and x, thereby also providing a constant velocity drive shaft. Illustrations of the drive shaft 80 in other positions will also reveal that the angles of the universal joints of each pair remain substantially equal in the manner described. Thus, for all positions the drive arrangement joining the tractor power output shaft and the mower blade 28 is driven at a substantially constant velocity relative to the power take-off shaft 35 of the tractor. Note also that the length 110 (FIG. 8) measured between the universal joint 90 and the bolt 106 connecting the arms 103 and 104 to the links 107 remains constant thereby maintaining the rigid section 94 substantially perpendicular to the links 107 to prevent the shaft from swinging over-center and creating internal stresses within the drive shaft 80.

By this invention, a mounting arrangement is provided for attaching a mower to a tractor, making use of the hydraulic lift of the tractor for raising and lowering the mower while enabling the pivoting of the mower about a horizontal axis for cutting grass on sloping surfaces. Additionally, the mower is driven effectively by the power take-off shaft of the tractor in all positions to which it may be moved, and substantially at a constant angular velocity thereby reducing wear and strain on the mower.

I claim as my invention:

1. An implement adapted to be pulled by the drawbar of a tractor having a hydraulic lift for raising and lowering the drawbar and also having a power take-off shaft for driving said implement, said implement comprising, a support frame adapted to be attached to the tractor drawbar and having one edge thereof extending past the side edge of the tractor, a housing hinged to said one edge of said frame for pivoting to positions substantially above and below the frame, a tool journaled on said housing, a gearbox mounted on said housing for driving said tool, an actuator connecting the frame and housing for pivoting said housing about the frame, and a drive arrangement connecting the take-off shaft and said housing gearbox for driving said tool, said drive arrangement comprising, a gearbox mounted on said frame gearbox and the tractor power take-off shaft, and a second drive shaft connecting said frame gearbox and the tractor power take-off shaft, and a second drive shaft connecting said frame gearbox and said housing gearbox, and first shaft including universal joints and a sliding torque-transmitting drive connection, and said second drive shaft including first and second rigid sections having first and second universal joints at the ends thereof, said first universal joint of said first rigid section being connected to said frame gearbox and said first universal joint of said second rigid section being connected to said housing gearbox, and a first torque transmitting slide connection connecting said second universal joints thereby to maintain a driving connection between the tool and the power take-off shaft as the housing is pivoted about the frame and the frame is raised and lowered to position the said tool.

2. An implement as defined in claim 1 wherein the universal joints of each of said first and second sections are connected in the shaft in an out of phase relationship and one of said rigid sections includes a second torque transmitting slide connection and said second drive shaft includes means to limit the movement of the ends of said rigid sections adjacent said second universal joints to a predetermined path relative to the gearbox to which said one rigid section is directly connected by a first universal joint.

3. An implement as defined in claim 2 wherein said predetermined path is an arc about a point fixed relative to the gearbox to which said one rigid section is directly connected.

4. A constant velocity drive shaft for connecting driving and driven elements mounted on first and second members hinged together to pivot relative to one another, said drive shaft comprising, first and second rigid sections having first and second universal joints at the ends thereof, said first universal joints being paired and said second universal joints being paired, said first universal joints of said first and second sections being connected to said driving and driven elements, respectively, a first torque transmitting slide connection connecting said second universal joints said first and second universal joints being connected in the shaft at right angles measured around the axis of said shaft to the other of the pair, one of said rigid sections including a second torque transmitting slide connection, and means to restrict movement of the ends of said rigid sections adjacent said second universal joints to an arcuate path about a point fixed relative to the element to which the rigid section including the second slide connection is directly connected thereby to force said pairs of first and second universal joints to bend at substantially equal angles as the members are pivoted relative to one another so each joint of a first or second pair will cancel out the angular acceleration of the other of the pair thereby to drive the driven element at a speed equal to that of the driving element.

5. A constant velocity drive shaft as defined in claim 4 including an arm journaled on each rigid section and extending past the second universal joint parallel to the longitudinal axis of the associated rigid section, means pivotally connecting the extending ends of said arms together, and said means to restrict movement of said extending ends of said arms acting to force said connecting means to move in an arcuate path as the members pivot relative to each other.

6. A constant velocity drive shaft as defined in claim 5 wherein said movement restricting means is a rigid link pivotally connected at one end to said arm ends and at the other end to the member supporting the gearbox adjacent said second sliding connection.

7. A constant velocity drive shaft for connecting driving and driven elements mounted on first and second members hinged together to pivot relative to one another, said drive shaft comprising first and second rigid sections having first and second universal joints at the ends thereof, said first universal joints of said first and second sections being connected to said driving and driven elements, respectively, a first torque transmitting slide connection connecting said second universal joints, said universal joints of each of said first and second sections are connected in the shaft in out of phase relationship, one of said rigid sections including a second torque transmitting slide connection, and means to limit the movement of the ends of said rigid sections adjacent said second universal joints to a predetermined path relative to the element to which said one rigid section is directly connected by its first universal joint whereby the driven element is driven at a speed equal to that of the driving element during pivotal movement of one member relative to the other.

References Cited

UNITED STATES PATENTS

| | | | |
|---|---|---|---|
| 2,976,663 | 3/1961 | Smith et al. | 56—25.4 |
| 3,015,927 | 1/1962 | Caldwell | 56—25.4 |
| 3,023,561 | 3/1962 | Gustafson | 56—25.4 |
| 3,047,995 | 8/1962 | Chestnut | 56—25.4 |
| 3,053,033 | 9/1962 | Maguire | 56—25.4 |
| 3,063,225 | 11/1962 | Barrentine | 56—25.4 |
| 3,197,948 | 8/1965 | Danford | 56—25.4 |
| 3,400,521 | 9/1968 | Caldwell | 56—6 |

ANTONIO F. GUIDA, Primary Examiner

P. A. RAZZANO, Assistant Examiner

U.S. Cl. X.R.

64—21, 23